United States Patent [19]

Hasuo

[11] Patent Number: 5,296,966
[45] Date of Patent: Mar. 22, 1994

[54] ELECTRONIC FILING SYSTEM
[75] Inventor: Kamon Hasuo, Kawasaki, Japan
[73] Assignee: Canon Kabushiki Kaisha, Tokyo, Japan
[21] Appl. No.: 598,952
[22] Filed: Oct. 17, 1990
[30] Foreign Application Priority Data Oct. 20, 1989 [JP] Japan .................................. 1-273431

[51] Int. Cl.⁵ ............................................ H04N 1/04
[52] U.S. Cl. .................................. 358/498; 358/496; 271/255; 271/256; 271/257
[58] Field of Search ............... 358/443, 498, 496, 486; 355/308, 200, 202, 210; 271/3.1, 255, 256, 257

[56] References Cited

U.S. PATENT DOCUMENTS

| | | | |
|---|---|---|---|
| 4,475,128 | 10/1984 | Koumura | 358/296 |
| 4,656,524 | 4/1987 | Norris et al. | 358/280 |
| 4,691,237 | 9/1987 | Shimizu | 358/256 |
| 4,908,719 | 3/1990 | Nonoyama | 358/494 |
| 5,038,222 | 8/1991 | Saito | 358/401 |
| 5,126,855 | 6/1992 | Saito | 358/496 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An electronic filing system includes a conveying section to convey an original put on an original setting plate to a reading position, a reading section to read an image of the original at the reading position, a manual feed mode control means device for executing a manual feed mode to convey and read the original each time it is detected that the original has been set onto the original setting plate, a continuous feed mode control means device for executing a continuous feed mode to continuously convey and continuously read a plurality of originals which were piled on the original setting plate, a mode selecting circuit to select either one of the manual feed mode and the continuous feed mode and a memory section to store the image which was read by the reading section together with index information. In this system, after storage of the image has been started in the manual feed mode, the feed mode can be switched to the continuous feed mode and the image can be stored together with the same index information without again inputting the index information.

11 Claims, 8 Drawing Sheets

| K (1, 1) | K (1, 2) | K (1, 3) | K (1, 4) | K (1, 5) |
|---|---|---|---|---|
| ☿ | ☎ | FAX | | |

| K (2, 1) | K (2, 2) | K (2, 3) | K (2, 4) | K (2, 5) |
|---|---|---|---|---|
| A SECTION | B SECTION | C SECTION | D SECTION | |

| K (3, 1) | K (3, 2) | K (3, 3) | K (3, 4) | K (3, 5) |
|---|---|---|---|---|
| ☆ | ◎ | ※ | | |

| K (4, 1) | K (4, 2) | K (4, 3) | K (4, 4) | K (4, 5) |
|---|---|---|---|---|
| △△ | ✂ | ♠ | | |

KEY WORD : ABCDE

KEY NUMBER : 12345

■ DISC NAME :
☐ DISC ATTRIBUTE : ERASABLE
☐ DISC RESIDUAL CAPACITY : 57%
☐ SCANNER SETTING : BOTH SIDES 8PEL

| NEXT DISPLAY | PHOTO-GRAPHING | RETURN |

ELECTRONIC FILING SYSTEM

BACKGROUND OF THE INVENTION

1. Field of the Invention

The present invention relates to an electronic filing system.

2. Related Background Art

In a conventional information memory device having an information retrieving function, in the case of registering image information, the operator opens a lid which covers an original glass plate, puts an original onto the original glass plate, closes the lid, and pushes a photographing start key.

Thus, the photographing operation is started the original is read, and the read image information is registered to an optical disc or the like.

In the case of retrieving the image information, the information is retrieved by using retrieval information such as a file name of the information stored, a key word corresponding to the storage content, and the like.

In the above conventional example, in the case of registering the image information of a plurality of originals, the above operation is repeatedly executed a number of times corresponding to the number of originals.

That is, the operator opens the lid which covers the original glass plate, takes out the first original, puts the second original onto the glass plate, closes the lid, and pushes the photographing start key. Thus, the photographing operation is started, the original is read, and the read image information is registered to the optical disc or the like. Then, the operator again opens the lid which covers the original glass plate, takes out the second original, puts the third original onto the glass plate, closes the lid, and pushes the photographing start key. Thus, the photographing operation is started, the original is read, and the read image information is registered to the optical disc or the like. Such a conventional photographing method is called a "single-frame photographing mode".

In the single-frame photographing mode, it is necessary to execute the opening and closing operations of the lid and the pushing operation of the photographing start key every original, so that the registering operations are extremely complicated. That is, the conventional apparatus has a problem such that the operations to register a plurality of image information are complicated.

To solve the above problems, it is preferable to continuously convey a plurality of originals set on an original setting plate to the original glass plate one by one and to execute the continuous paper feed mode for photographing. However, such a method is unsuitable in the case of checking a plurality of originals to be photographed one by one and, thereafter, photographing them. In a case when originals having different sizes such as A4, B5, and the like are hand only arranged and are photographed, there is a problem such that when the originals are put onto the original setting plate, the operation to align the originals is troublesome.

On the other hand, a method whereby both of the continuous paper feed mode and the single-frame photographing mode mentioned above are provided and either one of those modes can be selected is considered. However, in this case, it is necessary to execute the complicated registering operation as described above in the single-frame photographing mode, so that the problem such that the operation to register a plurality of image information is complicated still remains.

To solve the above problems, as disclosed in U.S. Pat. No. 5,038,222 and in application Ser. Nos. 478250, 477470, and the like, there is considered a method of selecting either one of the manual paper feed mode to feed and read the original paper each time the original which was inserted into a predetermined original inserting section is detected and the above continuous paper feed mode.

However, if the above method is used, in the case when the original is photographed in the manual mode during the operation in the continuous paper feed mode and the photographed images obtained in both of the two modes are stored into one file, it is necessary to once finish the continuous mode. Therefore, if one file is finished at that time point and, thereafter, when the photographing operation is started in the manual mode, another file is also formed with respect to the manual mode. To combine the file obtained by the continuous mode and the file derived by the manual mode into a single file, it is necessary to select the write-once mode and search a file to be written after the recording and write the image information once. As mentioned above, there is a problem such that the operation to combine the image which was photographed in the continuous mode and the image which was photographed in the manual mode into a single file is complicated.

SUMMARY OF THE INVENTION

It is an object of the present invention to provide an electronic filing system which can eliminate the foregoing drawbacks.

Another object of the invention is to provide an electronic filing system which can easily execute the operation to combine an image photographed in the continuous mode and an image photographed in the manual mode into a single file by enabling the continuous paper feed mode and the manual paper feed mode to be switched during the operation.

The above and other objects and features of the present invention will become apparent from the following detailed description and the appended claims with reference to the accompanying drawings.

DETAILED DESCRIPTION OF THE PREFERRED EMBODIMENT

Figure 1:
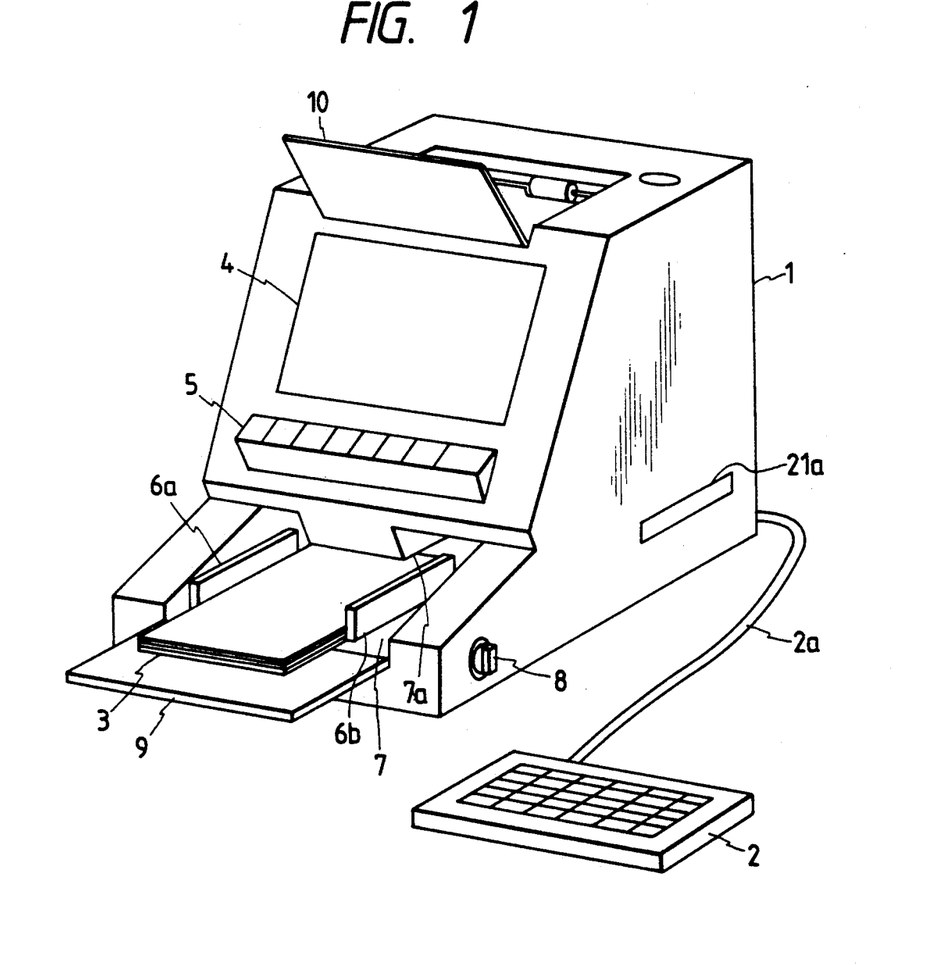
FIG. 1 is a perspective view showing an embodiment of the invention.

FIG. 1 is a perspective view showing an embodiment of the present invention.

The embodiment comprises: a keyboard 2 for inputting an operation command to control an electronic filing system 1 and for inputting characters or numerals; a signal line 2a connecting the electronic filing system main body 1 and the keyboard 2; a plate-shaped display device 4 which is constructed by a liquid crystal, an electroluminescence, a plasma, a fluorescent display tube, or the like; a key group 5; side plates 6a and 6b which are attached so as to restrict the lateral direction of sheet-like originals 3 and to be movable in the lateral direction on an original setting plate 7; an original inserting section 7a; a switching control 8; a tray 9 on which the originals 3 are supported; and a discharge tray 10.

The switching control 8 is shown as an example of mode selecting means for selecting either one of the manual paper feed mode and the continuous paper feed mode.

The foregoing "manual paper feed mode" is a mode in which after the operation to read the original was instructed, the original paper is fed and read each time the original which was inserted into the original inserting section 7a is detected. The foregoing "continuous paper feed mode" is a mode in which a plurality of originals which were piled onto the original setting plate are continuously conveyed and are continuously read.

Figure 2:
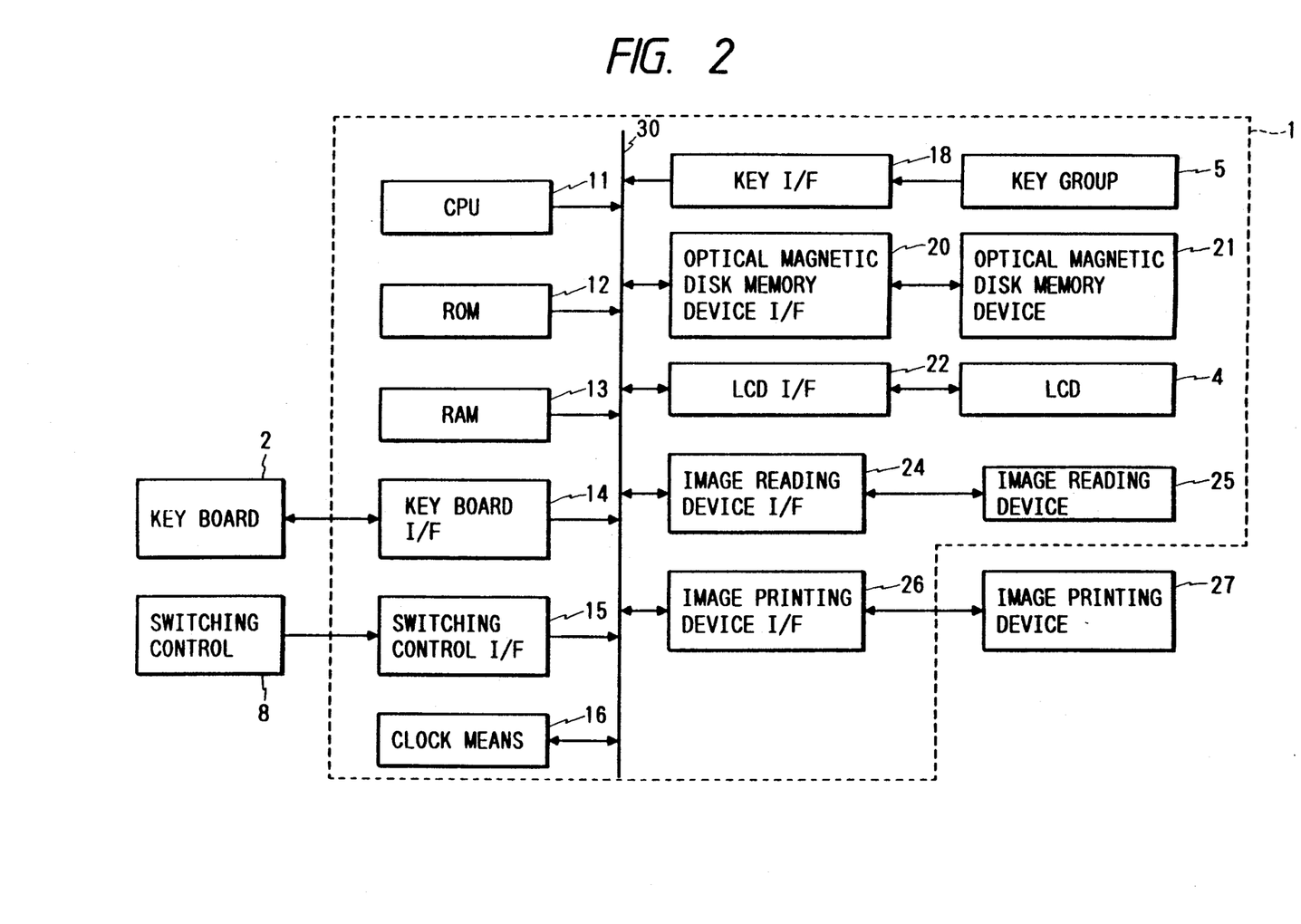
FIG. 2 is a block diagram showing an arrangement of an electronic filing system in the embodiment.

FIG. 2 is a block diagram mainly showing an internal arrangement of the electronic filing system 1 in the embodiment.

Figure 4:
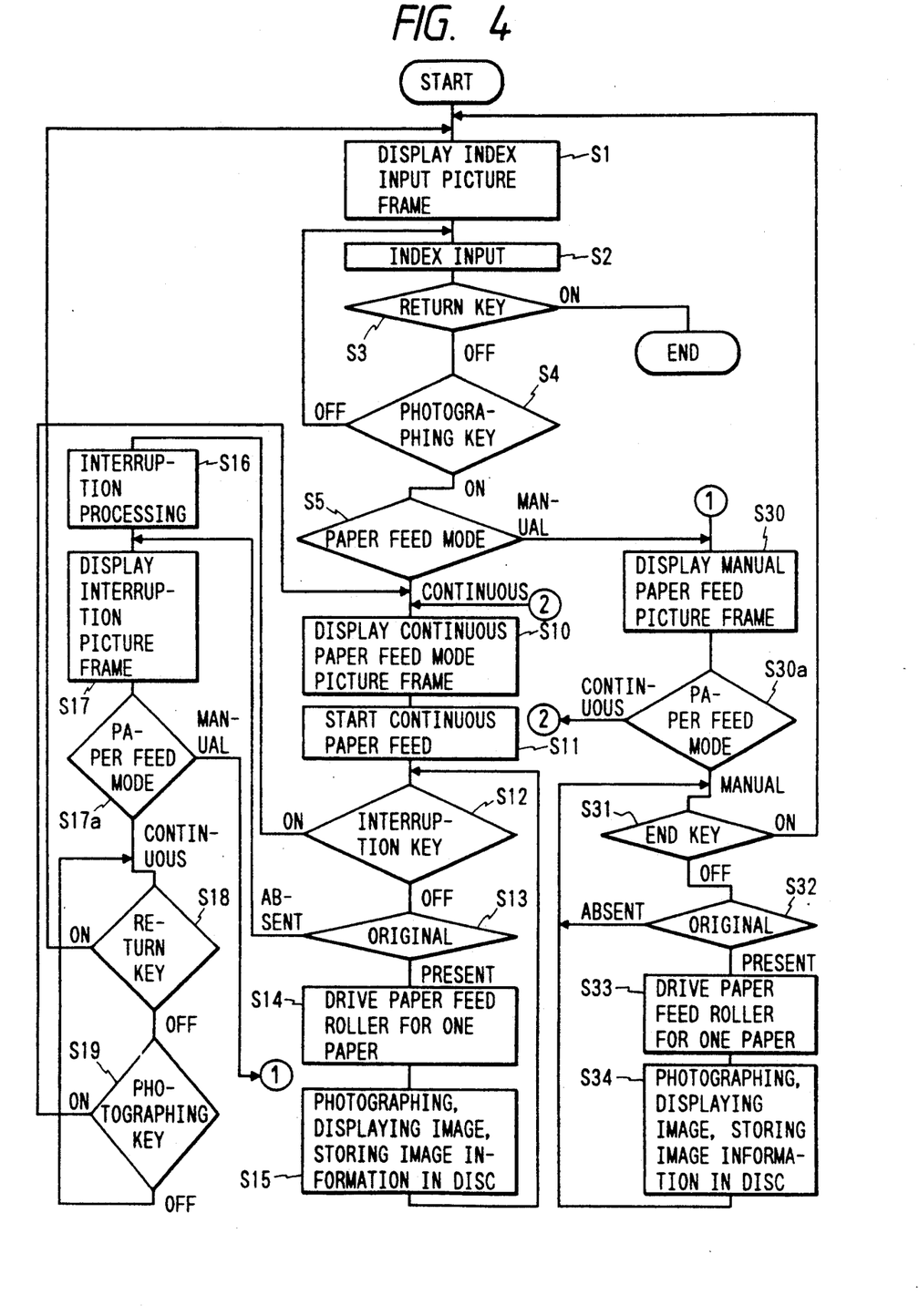
FIG. 4 is a flowchart showing the operation to photograph an original in the embodiment.

The electronic filing system 1 comprises: a CPU 11 to control the whole system 1; an ROM 12 in which a program for a flowchart shown in FIG. 4 and the like have been stored; an RAM 13 which is used as a work memory or the like; a keyboard I/F 14 for the keyboard 2; a switching control I/F 15 for the switching control 8; clock means 16 for counting the time regarding the year, month, day, hour, minute, and second; a key I/F 18 for the key group 5; a magnetooptic disc memory device 21 to store image data and the like onto a magnetooptic disc provided in the main body 1; an I/F 20 for the memory device 21; an LCD as an example of the display device 4; an I/F 22 for the LCD; an image reading device 25 such as a CCD or the like; an I/F 24 for the image reading device; and an I/F 26 for an image printing device. On the other hand, the electronic filing system 1 is connected to the keyboard 2 and an image printing device 27.

The CPU 11 executes the execution control of the manual paper feed mode, the execution control of the continuous paper feed mode, and the mode shift control to shift the operating mode to the continuous paper feed mode during the manual paper feed mode or to the manual paper feed mode during the continuous paper feed mode.

Figure 5:
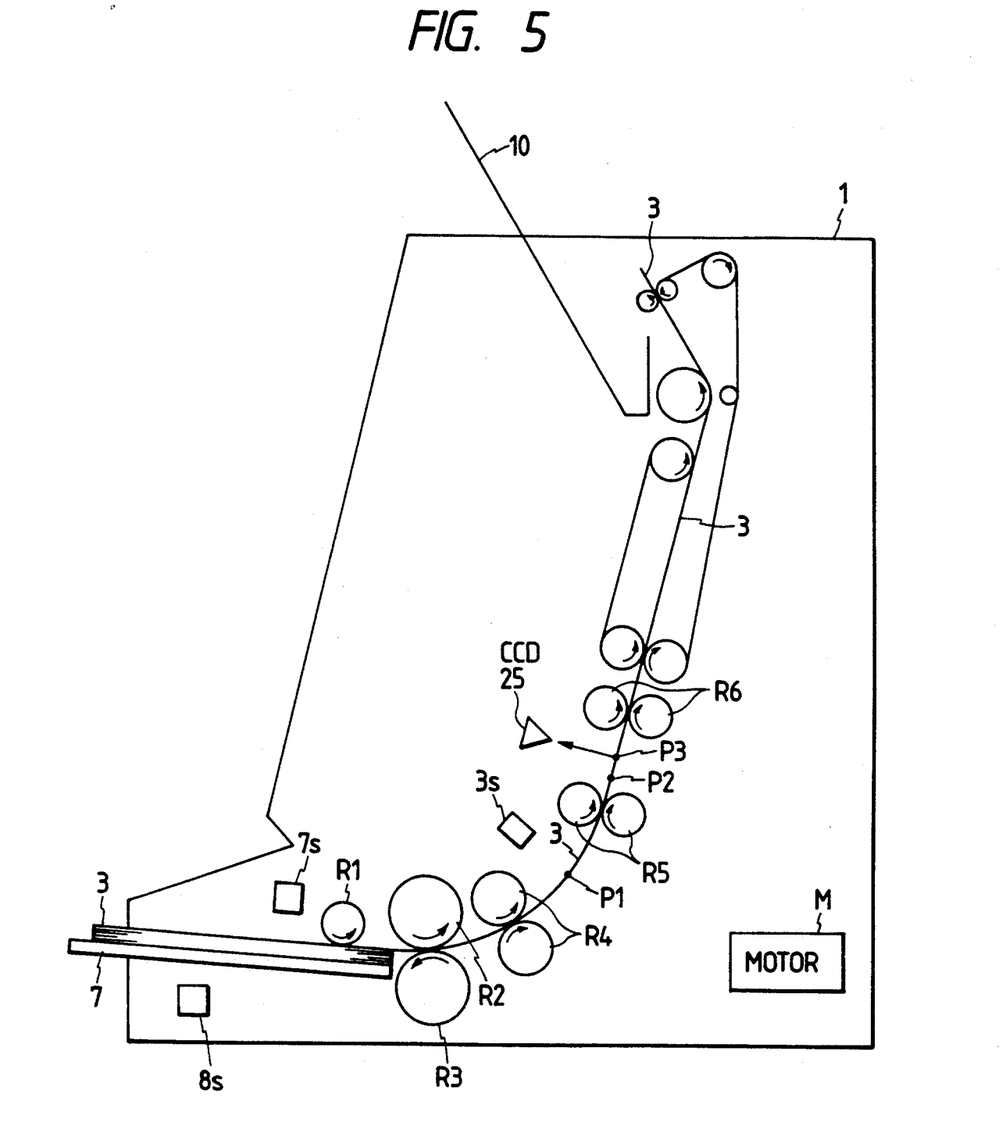
FIG. 5 is an explanatory diagram showing an example of a path along which an original is conveyed from an original setting plate 7 to a discharge tray 10 in the embodiment.

FIG. 5 is an explanatory diagram showing an example of a path along which the original 3 is conveyed from the original setting plate 7 to the discharge tray 10 in the embodiment.

In FIG. 5, the electronic filing system 1 has therein: a manual paper feed mode detecting sensor 8s to detect a state of the switching control 8; an original sensor 7s to detect that the originals 3 exist on the original setting plate 7; a paper feed sensor 3s to detect the presence of the original 3 at a predetermined position $P_1$ in front of the CCD 25; a motor M; a paper feed roller $R_1$; a separating feed roller $R_2$; a separating reverse roller $R_3$; feed rollers $R_4$; and conveying rollers $R_5$ and $R_6$.

The paper feed roller $R_1$ is used to pick up the originals 3 on the original setting plate 7 one by one. The separating feed roller $R_2$ and the separating reverse roller $R_3$ are used to convey only one original even if a plurality of originals 3 were picked up by the paper feed roller $R_1$. The motor M is used to unitarily drive the rollers $R_1$ to $R_6$.

On the other hand, $P_3$ indicates a position where the CCD 25 reads image information of the original which was exposed by a light source (not shown). $P_2$ denotes a position where the next original is set to a standby state until the image information of the original of one-preceding page has completely been stored to the magnetooptic disc. A combination of a long sensor and lenses can be also used in place of the CCD 25.

The rollers $R_1$ to $R_5$ are shown and used as an example of original conveying means for conveying the originals put on the original setting plate to the reading position.

The operation of the embodiment will now be described.

FIGS. 3A to 3D are diagrams showing display examples of the display device 4 in the respective states of the embodiment.

FIG. 4 is a flowchart showing the operation to photograph an original in the embodiment.

In the embodiment, a series of operations to read image information by the CCD 25 after the paper feed roller $R_1$ has picked up the original and to store the image information to the magnetooptic disc are referred to as "photograph" or "photographing".

First, a power source of the electronic filing system 1 is turned on, the present date displayed on the display device 4 is checked, and a disc is set. Then, an initial picture frame is displayed.

Figure 3A:
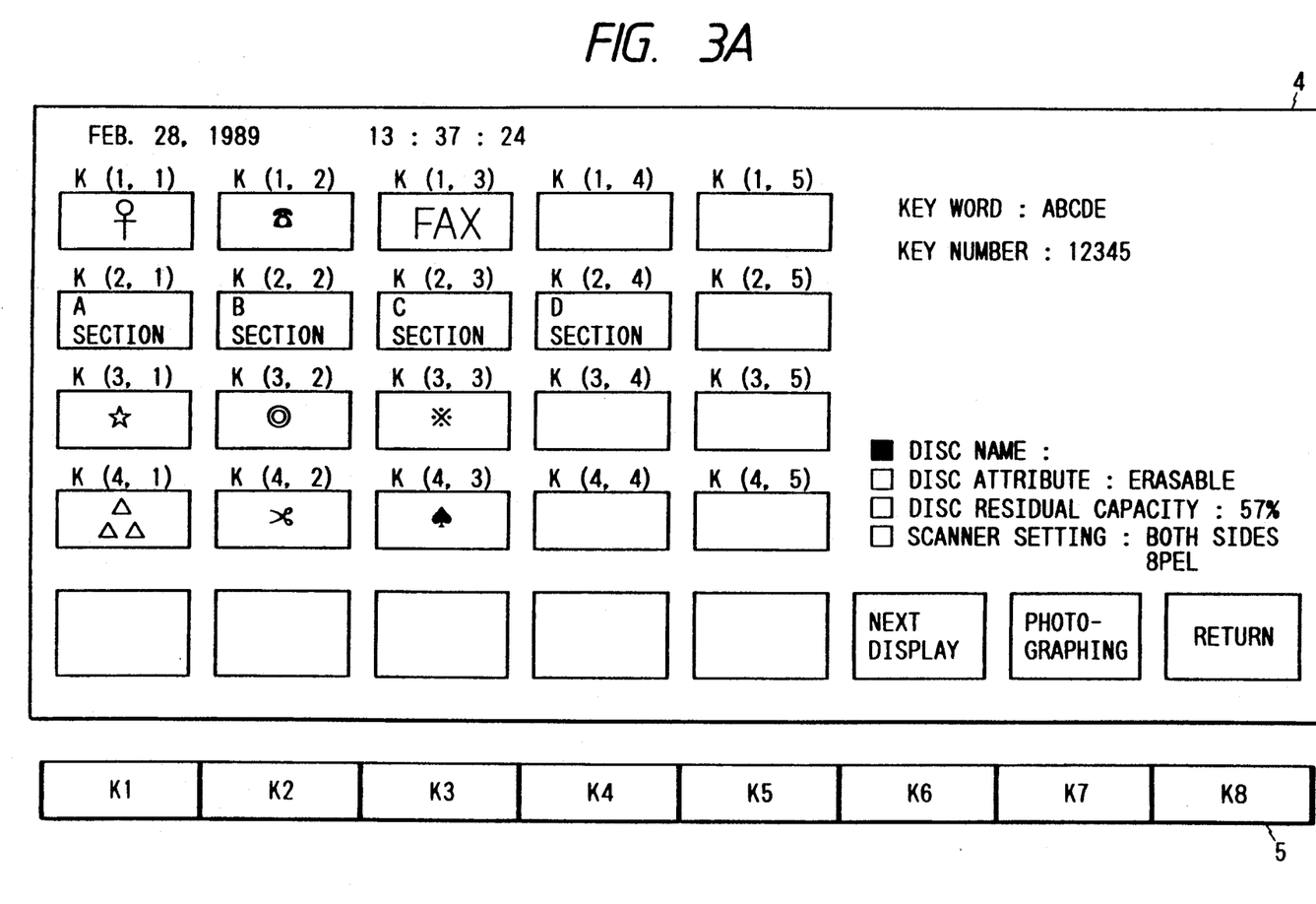
FIGS. 3A to 3D are diagrams showing display examples of a display device 4 in respective states of the embodiment.

When a mode to photograph the original is selected on the initial picture frame, an index input picture frame is displayed as shown in FIG. 3A (step S1).

Stamps K(1, 1) to K(4, 5) arranged like a matrix, a key word input area, a key number input area, a photographing key, and a return key are displayed in the index input picture frame. In the embodiment, "stamp" denotes a retrieval image indicative of retrieval information. A plurality of stamps also can be assigned to one image as retrieval information.

An index (stamp, key word, key number, etc.) corresponding to the image of an original to be photographed from now on is input by the key group 5 or the keyboard 2 (S2). When the photographing key is turned on (S4), the CPU 11 discriminates to see if the operating mode is the manual paper feed mode or the continuous paper feed mode on the basis of a detection signal from the manual paper feed mode detecting sensor 8s (S5).

Figure 3B:
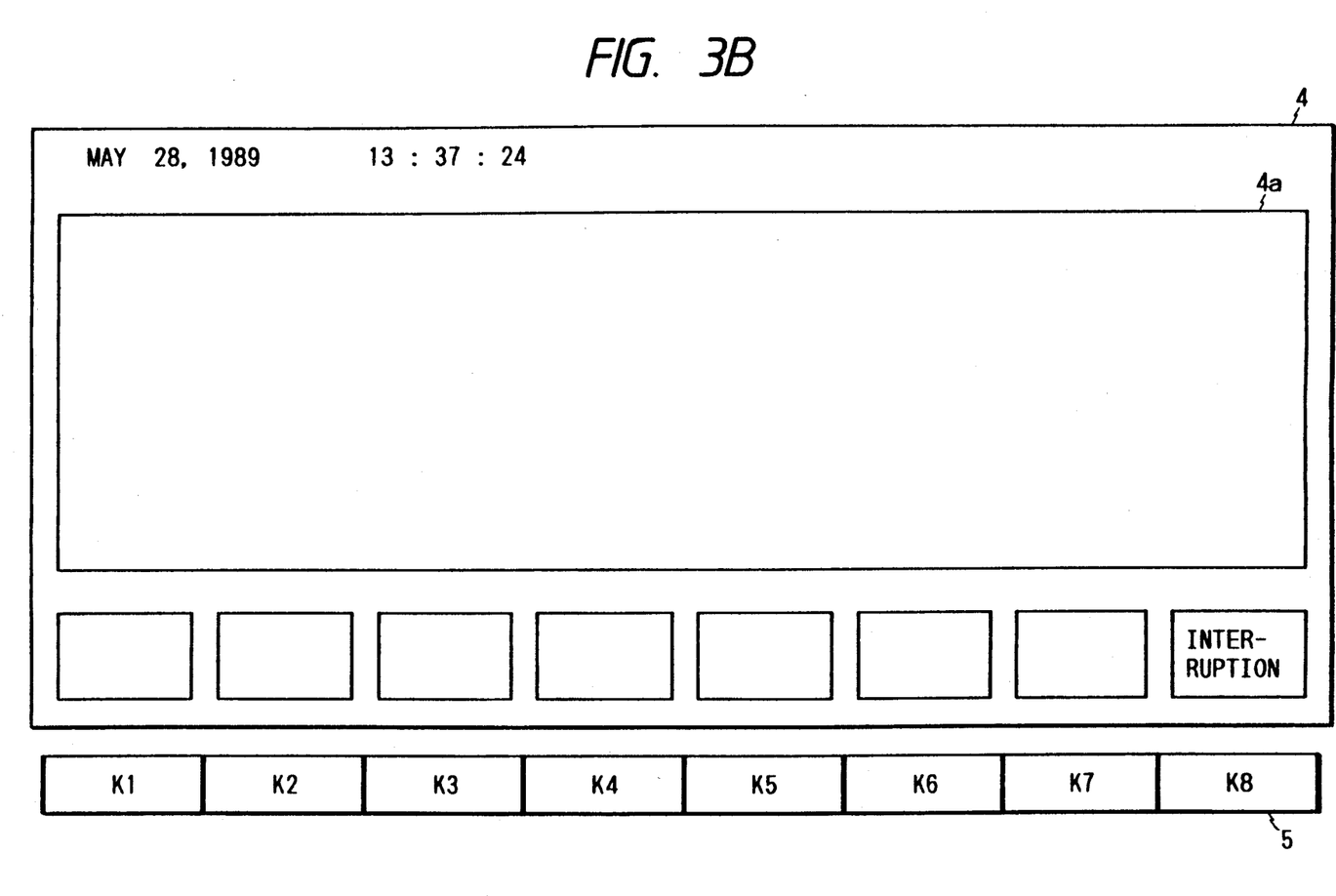

If the continuous paper feed mode has been set, a continuous paper feed mode picture frame shown in FIG. 3B is displayed on the display device 4 (S10). The continuous paper feed operation is started (S11). That is, the motor M rotates and the original setting plate 7 is elevated. At this time, if the original sensor 7s detects that the originals 3 have been set on the original setting plate 7 (S13), the paper feed rollers $R_4$ are driven for only one original, thereby feeding one of the originals 3 (S14).

The original 3 is read by the CCD 25 as an example of the image reading device during the movement of the original 3 which was fed, the image information of the original which was read is displayed in a photographing image display area 4a of the display device 4, and the image information of the read original is stored to the magnetooptic disc by the magnetooptic disc memory device 21 (S15).

In the continuous paper feed mode, a number of originals are set onto the original setting plate 7, and if an interruption key is pushed during the photographing of the originals (S12), that is, if a key K$_8$ shown in FIG. 3B is pressed, an interruption processing is executed (S16). Namely, the original setting plate 7 descends and the motor M is stopped. At this time, an interruption picture frame in the continuous paper feed mode shown in FIG. 3C is displayed on the display device 4.

Figure 3C:
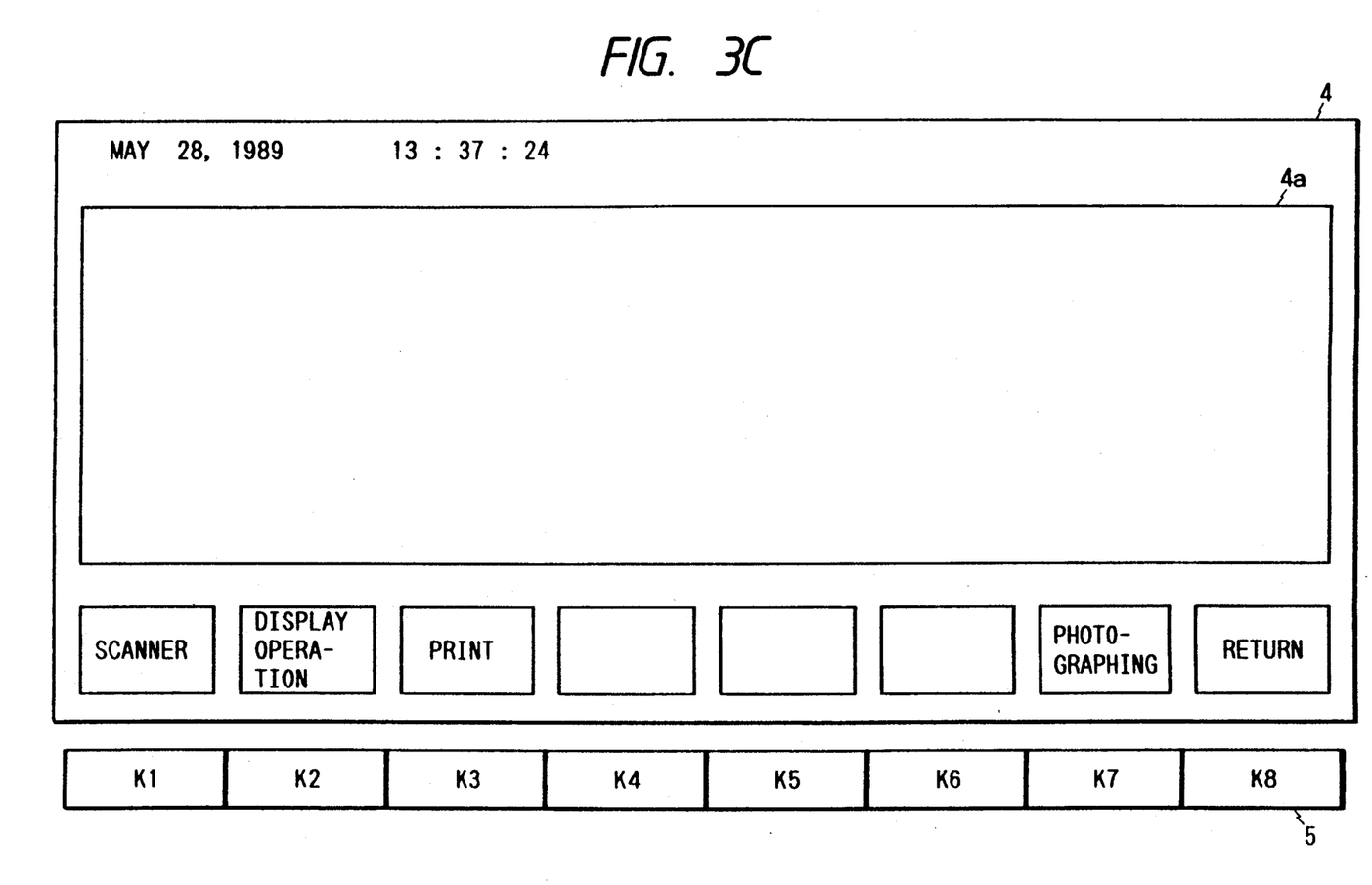

If the photographing operation so far is finished and the original 3 is photographed as a next file, the return key (key K$_8$ in FIG. 3C) is pressed and the next index is input (S1) and the subsequent operations are executed. On the other hand, in the case of photographing the next original 3 by using the index which has been used until the timing just before the above interruption (in the case of executing the continuous photographing to the same file), when the interruption picture frame shown in FIG. 3C is displayed on the display device 4, a photographing key (key K$_7$ in FIG. 3C) is pressed without pushing the return key (S19). Thus, the processing routine is returned to step S10 and the subsequent continuous paper feed mode is restarted.

Figure 3D:
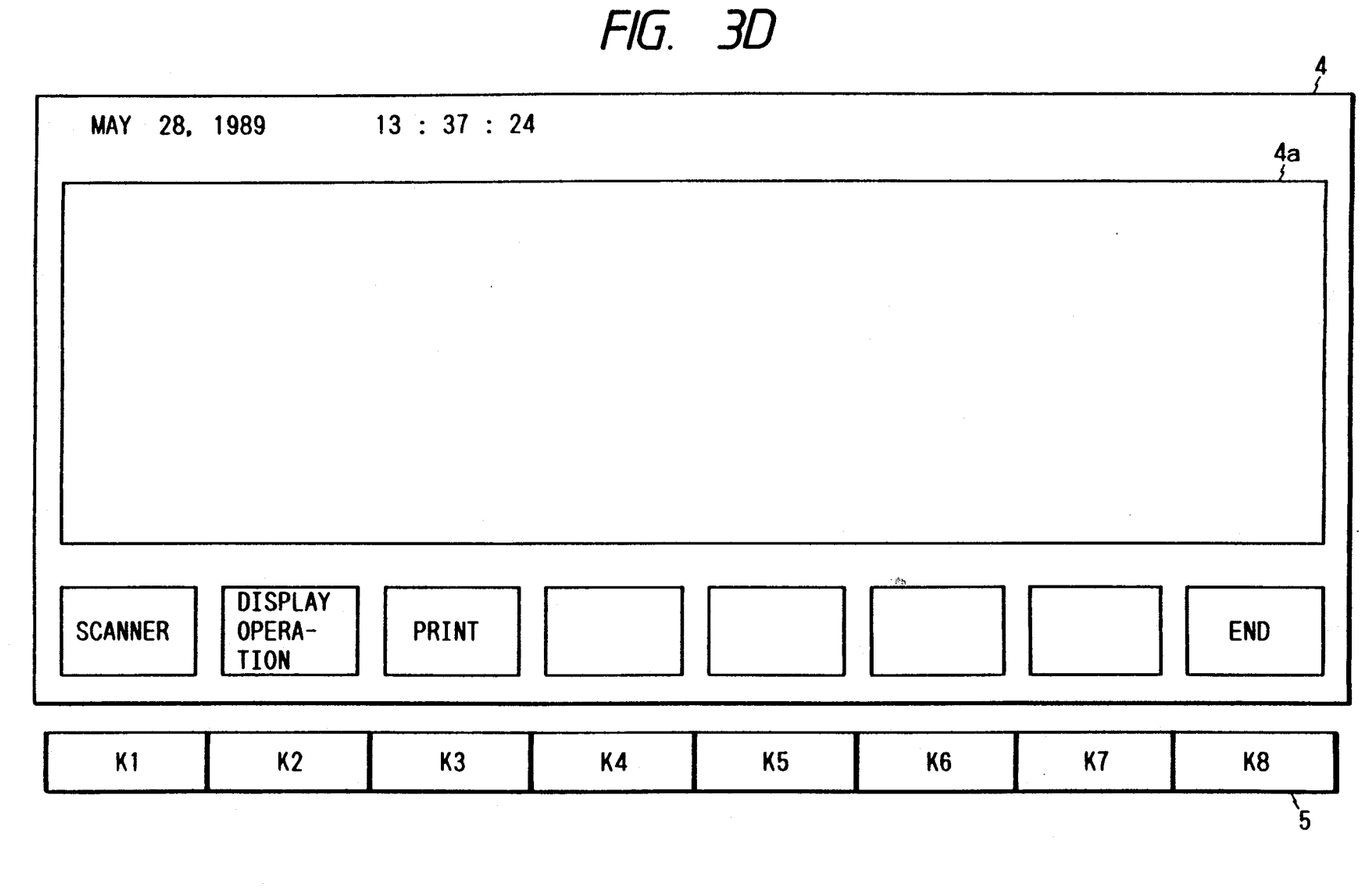

If the CPU 11 determines that the manual paper feed mode has been set on the basis of the signal from the sensor 8s in step S5, a manual paper feed mode picture frame shown in FIG. 3D is displayed on the display device 4 (S30). If the original 3 has been inserted into the original inserting section 7a (S32), the paper feed roller R$_1$ is driven for only one original, thereby feeding one original 3 (S33). In the manual mode, the original setting plate 7 is elevated and fixed in association with the switching control 8 being set to the manual paper feed position.

The original 3 which was fed is read by the CCD 25 during the movement of the original, the read original is displayed in the photographing image display area 4a of the display device 4, and the image information of the read original is stored to the magnetooptic disc (S34)

In the manual mode, a clutch is disconnected and the rotation of the separating reverse roller R$_3$ is stopped.

When an end key is pressed while the manual paper feed mode picture frame is displayed (S31), the manual paper feed mode is finished, that is, the photographing of the file so far is finished and the photographing of the original for the next file is started.

When the interruption picture frame is being displayed in step S17 during the continuous paper feed mode, if the paper feed mode has been changed to the manual mode by the mode selecting means (S17a), the manual paper feed mode picture frame is displayed (S30). After that, the operating mode is shifted to the manual paper feed mode. In this case, since the return key K$_8$ is not pressed, the file obtained in the continuous paper feed mode is continued. In other words, the photographing image in the continuous paper feed mode and the photographing image in the subsequent manual paper feed mode are stored into one file. Moreover, the operation to store the image photographed in the continuous paper feed mode and the image photographed in the subsequent manual paper feed mode into the file can be fairly easily executed.

On the other hand, if the paper feed mode has been changed to the continuous mode by the mode selecting means during the manual paper feed mode (S30a), the continuous paper feed mode picture frame is displayed (S10). The operating mode is shifted to the continuous paper feed mode. In this case, since the return key K$_8$ is not pressed, the file obtained in the manual paper feed mode is continued. That is, the photographing image in the manual paper feed mode and the subsequent photographing image in the continuous paper feed mode are stored into one file. Moreover, the photographing image in the manual paper feed mode and the subsequent photographing image in the continuous paper feed mode can be extremely easily stored into one file.

When the index input picture frame is being displayed (S2), if the return key is turned on (S3), the original reading operation is finished.

As mentioned above, there are many advantages such that the executing mode can be easily changed and the operation to store the image photographed in the continuous mode and the image photographed in the manual mode into one file can be easily performed.

What is claimed is:

1. An electronic filing system comprising:
   a conveying section for conveying an original put on an original setting plate to a reading position;
   a reading section for reading an image of the original at the reading position;
   manual feed mode control means for executing a manual feed mode to convey and read the original each time the original has been set onto the original setting plate;
   continuous feed mode control means for executing a continuous feed mode to continuously convey and continuously read a plurality of originals which were stacked on the original setting plate;
   a mode selecting circuit for selecting either one of the manual feed mode and the continuous feed mode;
   input means for inputting index information;
   a memory section for storing the image, which was read by the reading section, together with the index information input by said input means; and
   control means for controlling said input means to set the index information for the original already read in the manual feed mode, without re-inputting the index information by said input means, as the index information for a new original to be read in the continuous feed mode.

2. A system according to claim 1, further comprising a displaying section for displaying the image which was read by the reading section.

3. A system according to claim 1, wherein the memory section stores the image onto a magnetooptic recording medium.

4. A system according to claim 2, wherein the conveying section, the reading section, the memory section, and the displaying section are arranged in one unit.

5. An electronic filing system comprising:
   a conveying section for conveying an original put on an original setting plate to a reading position;
   a reading section for reading an image of the original at the reading position;
   manual feed mode control means for executing a manual feed mode for conveying and reading the original each time the original has been set onto the original setting plate;
   continuous feed mode control means for executing a continuous feed mode to continuously convey and continuously read a plurality of originals which were stacked on the original setting plate;
   a mode selecting circuit for selecting either one of the manual feed mode and the continuous feed mode;

a memory section for storing the image, which was read by the reading section, together with index information; and an end key for finishing the image reading operation, wherein after the storage of the image has been started in the manual feed mode, the feed mode can be switched to the continuous feed mode and the image can be stored together with the same index information without again inputting the index information and when the end key is turned on in the manual feed mode, the memory section makes it possible to store the image by different index information.

6. An electronic filing system comprising:
a conveying section for conveying an original put on an original setting plate to a reading position;
a reading section for reading an image of the original at the reading position;
manual feed mode control means for executing a manual feed mode for conveying and reading the original each time the original has been set onto the original setting plate;
continuous feed mode control means for executing a continuous feed mode to continuously convey and continuously read a plurality of originals which were stacked on the original setting plate;
a mode selecting circuit for selecting either one of the manual feed mode and the continuous feed mode; and
a memory section for storing the image, which was read by the reading section, together with index information; and
an interruption key for interrupting the continuous feed mode,
wherein after the storage of the image has been started in the continuous feed mode, the feed mode can be switched to the manual feed mode and the image can be stored together with the same index information without again inputting the index information and when the continuous feed mode is interrupted, the feed mode can be switched to the manual feed mode.

7. An electronic filing system comprising:
a conveying section for conveying an original put on an original setting plate to a reading position;
a reading section for reading an image of the original at the reading position;
manual feed mode control means for executing a manual feed mode for conveying and reading the original each time the original has been set onto the original setting plate;
continuous feed mode control means for executing a continuous feed mode to continuously convey and continuously read a plurality of originals which were stacked on the original setting plate;
a mode selecting circuit for selecting either one of the manual feed mode and the continuous feed mode; and
a memory section for storing the image, which was read by the reading section, together with index information; and
an input key for finishing the image reading operation,
wherein after the storage of the image has been started in the continuous feed mode, the feed mode can be switched to the manual feed mode and the image can be stored together with the same index information without again inputting the index information and when the input key is turned on in the continuous feed mode, the memory section makes it possible to store the image by different index information.

8. An electronic filing system comprising:
a conveying section for conveying an original put on an original setting plate to a reading position;
a reading section for reading an image of the original at the reading position;
manual feed mode control means for executing a manual feed mode to convey and read the original each time the original has been set onto the original setting plate;
continuous feed mode control means for executing a continuous feed mode to continuously convey and continuously read a plurality of originals which were stacked on the original setting plate;
a mode selecting circuit for selecting either one of the manual feed mode and the continuous feed mode;
input means for inputting index information;
a memory section for storing the image, which was read by the reading section, together with index information; and
control means for controlling said input means to set the index information for the original already read in the continuous feed mode, without re-inputting the index information by said input means, as the index information for a new original to be read in manual feed mode.

9. A system according to claim 8, further comprising a displaying section for displaying the image which was read by the reading section.

10. A system according to claim 8, wherein the memory section stores the image onto a magnetooptic recording medium.

11. A system according to claim 9, wherein the conveying section, the reading section, the memory section, and the displaying section are arranged in one unit.

* * * * *